(12) United States Patent
Woolward

(10) Patent No.: US 10,264,025 B2
(45) Date of Patent: *Apr. 16, 2019

(54) SECURITY POLICY GENERATION FOR VIRTUALIZATION, BARE-METAL SERVER, AND CLOUD COMPUTING ENVIRONMENTS

(71) Applicant: vArmour Networks, Inc., Mountain View, CA (US)

(72) Inventor: Marc Woolward, Santa Cruz, CA (US)

(73) Assignee: vArmour Networks, Inc., Mountain View, CA (US)

(*) Notice: Subject to any disclaimer, the term of this patent is extended or adjusted under 35 U.S.C. 154(b) by 64 days.

This patent is subject to a terminal disclaimer.

(21) Appl. No.: 15/201,351

(22) Filed: Jul. 1, 2016

(65) Prior Publication Data
US 2017/0374101 A1    Dec. 28, 2017

Related U.S. Application Data

(63) Continuation-in-part of application No. 15/192,967, filed on Jun. 24, 2016, now Pat. No. 9,560,081.

(51) Int. Cl.
| | | |
|---|---|---|
| G06F 17/00 | (2006.01) | |
| H04L 29/06 | (2006.01) | |
| G06F 9/455 | (2018.01) | |

(52) U.S. Cl.
CPC .......... *H04L 63/20* (2013.01); *G06F 9/45558* (2013.01); *H04L 63/0263* (2013.01);
(Continued)

(58) Field of Classification Search
CPC . H04L 63/20; H04L 63/1416; H04L 63/0263; G06F 9/45558; G06F 2009/45591; G06F 2009/45587
(Continued)

(56) References Cited

U.S. PATENT DOCUMENTS

| | | |
|---|---|---|
| 6,253,321 B1 | 6/2001 | Nikander et al. |
| 6,484,261 B1 | 11/2002 | Wiegel |

(Continued)

FOREIGN PATENT DOCUMENTS

| | | |
|---|---|---|
| TW | 201642616 A | 12/2016 |
| TW | 201642617 A | 12/2016 |

(Continued)

OTHER PUBLICATIONS

Non-Final Office Action, dated Jul. 1, 2015, U.S. Appl. No. 14/673,640, filed Mar. 30, 2015.
(Continued)

*Primary Examiner* — Mohammad W Reza
(74) *Attorney, Agent, or Firm* — Carr & Ferrell LLP

(57) ABSTRACT

Methods, systems, and media for security in virtualization, bare-metal server, and cloud computing environments are provided herein. Exemplary methods include: receiving network traffic associated with a primary workload; generating first metadata using the network traffic; determining a primary categorization associated with the primary workload, using the first metadata; confirming the primary categorization is reliable; determining a secondary categorization associated with at least one secondary workload, the at least one secondary workload being communicatively coupled to the primary workload; ascertaining the primary categorization and the secondary categorization are consistent with each other and are each stable; producing a model using the primary categorization and the secondary categorization; checking the model for sustained convergence; and generating a high-level declarative security policy associated with the primary workload using the model, the high-level declarative security policy indicating at least an application or service with which the primary workload can communicate.

20 Claims, 9 Drawing Sheets

(52) U.S. Cl.
CPC ............... *H04L 63/1416* (2013.01); *G06F 2009/45587* (2013.01); *G06F 2009/45591* (2013.01)

(58) Field of Classification Search
USPC .......................................................... 726/1
See application file for complete search history.

(56) References Cited

U.S. PATENT DOCUMENTS

| | | |
|---|---|---|
| 6,578,076 B1 | 6/2003 | Putzolu |
| 6,765,864 B1 | 7/2004 | Natarajan et al. |
| 6,970,459 B1 | 11/2005 | Meier |
| 6,981,155 B1 | 12/2005 | Lyle et al. |
| 7,058,712 B1 | 6/2006 | Vasko et al. |
| 7,062,566 B2 | 6/2006 | Amara et al. |
| 7,096,260 B1* | 8/2006 | Zavalkovsky ......... H04L 47/10 370/232 |
| 7,373,524 B2 | 5/2008 | Motsinger et al. |
| 7,397,794 B1 | 7/2008 | Lacroute et al. |
| 7,467,408 B1 | 12/2008 | O'Toole, Jr. |
| 7,475,424 B2 | 1/2009 | Lingafelt et al. |
| 7,516,476 B1 | 4/2009 | Kraemer et al. |
| 7,519,062 B1 | 4/2009 | Kloth et al. |
| 7,694,181 B2 | 4/2010 | Noller et al. |
| 7,725,937 B1 | 5/2010 | Levy |
| 7,742,414 B1 | 6/2010 | Iannaccone et al. |
| 7,761,917 B1 | 7/2010 | Kumar |
| 7,774,837 B2 | 8/2010 | McAlister |
| 7,849,495 B1 | 12/2010 | Huang et al. |
| 7,882,560 B2 | 2/2011 | Kraemer et al. |
| 7,900,240 B2 | 3/2011 | Terzis et al. |
| 7,904,454 B2 | 3/2011 | Raab |
| 7,996,255 B1 | 8/2011 | Shenoy et al. |
| 8,051,460 B2 | 11/2011 | Lum et al. |
| 8,099,760 B2 | 1/2012 | Cohen et al. |
| 8,112,304 B2 | 2/2012 | Scates |
| 8,166,554 B2 | 4/2012 | John |
| 8,254,381 B2 | 8/2012 | Allen et al. |
| 8,259,571 B1 | 9/2012 | Raphel et al. |
| 8,291,495 B1 | 10/2012 | Burns et al. |
| 8,296,459 B1 | 10/2012 | Brandwine et al. |
| 8,307,422 B2 | 11/2012 | Varadhan et al. |
| 8,321,862 B2 | 11/2012 | Swamy et al. |
| 8,353,021 B1 | 1/2013 | Satish et al. |
| 8,369,333 B2 | 2/2013 | Hao et al. |
| 8,396,986 B2 | 3/2013 | Kanada et al. |
| 8,429,647 B2 | 4/2013 | Zhou |
| 8,468,113 B2 | 6/2013 | Harrison et al. |
| 8,490,153 B2 | 7/2013 | Bassett et al. |
| 8,494,000 B1 | 7/2013 | Nadkarni et al. |
| 8,499,330 B1 | 7/2013 | Albisu et al. |
| 8,528,091 B2 | 9/2013 | Bowen et al. |
| 8,555,388 B1 | 10/2013 | Wang et al. |
| 8,565,118 B2 | 10/2013 | Shukla et al. |
| 8,612,744 B2 | 12/2013 | Shieh |
| 8,661,434 B1 | 2/2014 | Liang et al. |
| 8,677,496 B2 | 3/2014 | Wool |
| 8,688,491 B1 | 4/2014 | Shenoy et al. |
| 8,726,343 B1 | 5/2014 | Borzycki et al. |
| 8,730,963 B1 | 5/2014 | Grosser, Jr. et al. |
| 8,776,170 B2 | 7/2014 | Bezilla et al. |
| 8,798,055 B1 | 8/2014 | An |
| 8,813,169 B2 | 8/2014 | Shieh et al. |
| 8,813,236 B1 | 8/2014 | Saha et al. |
| 8,819,762 B2 | 8/2014 | Harrison et al. |
| 8,898,788 B1 | 11/2014 | Aziz et al. |
| 8,935,457 B2 | 1/2015 | Feng et al. |
| 8,938,782 B2 | 1/2015 | Sawhney et al. |
| 8,959,571 B2 | 2/2015 | Dan |
| 8,990,371 B2 | 3/2015 | Kalyanaraman et al. |
| 9,009,829 B2 | 4/2015 | Stolfo et al. |
| 9,015,299 B1* | 4/2015 | Shah ......... H04L 29/06 709/223 |
| 9,027,077 B1 | 5/2015 | Bharali et al. |
| 9,036,639 B2 | 5/2015 | Zhang |
| 9,060,025 B2 | 6/2015 | Xu |
| 9,141,625 B1 | 9/2015 | Thornewell et al. |
| 9,191,327 B2 | 11/2015 | Shieh |
| 9,258,275 B2 | 2/2016 | Sun et al. |
| 9,294,302 B2 | 3/2016 | Sun et al. |
| 9,294,442 B1 | 3/2016 | Lian et al. |
| 9,361,089 B2 | 6/2016 | Bradfield et al. |
| 9,380,027 B1 | 6/2016 | Lian et al. |
| 9,407,602 B2 | 8/2016 | Feghali et al. |
| 9,521,115 B1 | 12/2016 | Woolward |
| 9,609,083 B2 | 3/2017 | Shieh |
| 9,621,595 B2 | 4/2017 | Lian et al. |
| 9,680,852 B1 | 6/2017 | Wager et al. |
| 9,762,599 B2 | 9/2017 | Wager et al. |
| 9,973,472 B2 | 5/2018 | Woolward et al. |
| 10,009,317 B2 | 6/2018 | Woolward |
| 10,009,381 B2 | 6/2018 | Lian et al. |
| 10,091,238 B2 | 10/2018 | Shieh et al. |
| 10,191,758 B2 | 1/2019 | Ross et al. |
| 10,193,929 B2 | 1/2019 | Shieh et al. |
| 2002/0031103 A1 | 3/2002 | Wiedeman et al. |
| 2002/0066034 A1 | 5/2002 | Schlossberg et al. |
| 2003/0055950 A1 | 3/2003 | Cranor et al. |
| 2003/0177389 A1 | 9/2003 | Albert et al. |
| 2004/0062204 A1 | 4/2004 | Bearden et al. |
| 2004/0095897 A1 | 5/2004 | Vafaei |
| 2004/0172557 A1 | 9/2004 | Nakae et al. |
| 2005/0021943 A1 | 1/2005 | Ikudome et al. |
| 2005/0033989 A1 | 2/2005 | Poletto et al. |
| 2005/0114829 A1 | 5/2005 | Robin et al. |
| 2005/0190758 A1 | 9/2005 | Gai et al. |
| 2005/0201343 A1 | 9/2005 | Sivalingham et al. |
| 2005/0246241 A1 | 11/2005 | Irizarry, Jr. et al. |
| 2005/0283823 A1 | 12/2005 | Okajo et al. |
| 2006/0005228 A1 | 1/2006 | Matsuda |
| 2006/0037077 A1 | 2/2006 | Gadde et al. |
| 2006/0050696 A1 | 3/2006 | Shah et al. |
| 2006/0129672 A1 | 6/2006 | Mayer |
| 2007/0016945 A1 | 1/2007 | Bassett et al. |
| 2007/0019621 A1 | 1/2007 | Perry et al. |
| 2007/0022090 A1 | 1/2007 | Graham |
| 2007/0064617 A1 | 3/2007 | Reves |
| 2007/0079308 A1 | 4/2007 | Chiaramonte et al. |
| 2007/0130566 A1 | 6/2007 | van Rietschote et al. |
| 2007/0168971 A1 | 7/2007 | Royzen et al. |
| 2007/0192861 A1 | 8/2007 | Varghese et al. |
| 2007/0192863 A1 | 8/2007 | Kapoor et al. |
| 2007/0198656 A1 | 8/2007 | Mazzaferri et al. |
| 2007/0239987 A1 | 10/2007 | Hoole et al. |
| 2007/0271612 A1 | 11/2007 | Fang et al. |
| 2007/0277222 A1 | 11/2007 | Pouliot |
| 2008/0016339 A1 | 1/2008 | Shukla |
| 2008/0016550 A1 | 1/2008 | McAlister |
| 2008/0083011 A1 | 4/2008 | McAlister et al. |
| 2008/0155239 A1 | 6/2008 | Chowdhury et al. |
| 2008/0163207 A1 | 7/2008 | Reumann et al. |
| 2008/0229382 A1 | 9/2008 | Vitalos |
| 2008/0239961 A1 | 10/2008 | Hilerio et al. |
| 2008/0301770 A1 | 12/2008 | Kinder |
| 2008/0307110 A1 | 12/2008 | Wainner et al. |
| 2009/0077621 A1 | 3/2009 | Lang et al. |
| 2009/0083445 A1 | 3/2009 | Ganga |
| 2009/0138316 A1 | 5/2009 | Weller et al. |
| 2009/0165078 A1 | 6/2009 | Samudrala et al. |
| 2009/0190585 A1 | 7/2009 | Allen et al. |
| 2009/0249470 A1 | 10/2009 | Litvin et al. |
| 2009/0260051 A1 | 10/2009 | Igakura |
| 2009/0268667 A1 | 10/2009 | Gandham et al. |
| 2009/0328187 A1 | 12/2009 | Meisel |
| 2010/0043068 A1 | 2/2010 | Varadhan et al. |
| 2010/0064341 A1 | 3/2010 | Aldera |
| 2010/0071025 A1 | 3/2010 | Devine et al. |
| 2010/0088738 A1 | 4/2010 | Bimbach |
| 2010/0095367 A1 | 4/2010 | Narayanaswamy |
| 2010/0191863 A1 | 7/2010 | Wing |
| 2010/0192223 A1 | 7/2010 | Ismael et al. |
| 2010/0192225 A1 | 7/2010 | Ma et al. |
| 2010/0199349 A1 | 8/2010 | Ellis |

(56) References Cited

U.S. PATENT DOCUMENTS

| | | |
|---|---|---|
| 2010/0208699 A1 | 8/2010 | Lee et al. |
| 2010/0228962 A1 | 9/2010 | Simon et al. |
| 2010/0235880 A1 | 9/2010 | Chen et al. |
| 2010/0274970 A1 | 10/2010 | Treuhaft et al. |
| 2010/0281539 A1 | 11/2010 | Burns et al. |
| 2010/0287544 A1 | 11/2010 | Bradfield et al. |
| 2010/0333165 A1 | 12/2010 | Basak et al. |
| 2011/0003580 A1 | 1/2011 | Belrose et al. |
| 2011/0022812 A1 | 1/2011 | van der Linden et al. |
| 2011/0069710 A1 | 3/2011 | Naven et al. |
| 2011/0072486 A1 | 3/2011 | Hadar et al. |
| 2011/0090915 A1 | 4/2011 | Droux et al. |
| 2011/0113472 A1 | 5/2011 | Fung et al. |
| 2011/0138384 A1 | 6/2011 | Bozek et al. |
| 2011/0138441 A1 | 6/2011 | Neystadt et al. |
| 2011/0184993 A1 | 7/2011 | Chawla et al. |
| 2011/0225624 A1 | 9/2011 | Sawhney et al. |
| 2011/0249679 A1 | 10/2011 | Lin et al. |
| 2011/0263238 A1 | 10/2011 | Riley et al. |
| 2012/0017258 A1 | 1/2012 | Suzuki |
| 2012/0113989 A1 | 5/2012 | Akiyoshi |
| 2012/0130936 A1 | 5/2012 | Brown et al. |
| 2012/0131685 A1 | 5/2012 | Broch et al. |
| 2012/0185913 A1 | 7/2012 | Martinez et al. |
| 2012/0207174 A1 | 8/2012 | Shieh |
| 2012/0216273 A1 | 8/2012 | Rolette et al. |
| 2012/0278903 A1 | 11/2012 | Pugh |
| 2012/0284792 A1 | 11/2012 | Liem |
| 2012/0297383 A1 | 11/2012 | Meisner et al. |
| 2012/0311144 A1 | 12/2012 | Akelbein et al. |
| 2012/0311575 A1 | 12/2012 | Song |
| 2012/0324567 A1 | 12/2012 | Couto et al. |
| 2013/0019277 A1 | 1/2013 | Chang et al. |
| 2013/0081142 A1 | 3/2013 | McDougal et al. |
| 2013/0086399 A1 | 4/2013 | Tychon et al. |
| 2013/0097692 A1 | 4/2013 | Cooper et al. |
| 2013/0145465 A1 | 6/2013 | Wang et al. |
| 2013/0151680 A1 | 6/2013 | Salinas et al. |
| 2013/0166490 A1 | 6/2013 | Elkins et al. |
| 2013/0166720 A1 | 6/2013 | Takashima et al. |
| 2013/0219384 A1 | 8/2013 | Srinivasan et al. |
| 2013/0223226 A1 | 8/2013 | Narayanan et al. |
| 2013/0250956 A1 | 9/2013 | Sun et al. |
| 2013/0263125 A1 | 10/2013 | Shamsee et al. |
| 2013/0275592 A1 | 10/2013 | Xu et al. |
| 2013/0276092 A1 | 10/2013 | Sun et al. |
| 2013/0283336 A1 | 10/2013 | Macy et al. |
| 2013/0291088 A1 | 10/2013 | Shieh et al. |
| 2013/0298181 A1 | 11/2013 | Smith et al. |
| 2013/0298184 A1 | 11/2013 | Ermagan et al. |
| 2013/0318617 A1 | 11/2013 | Chaturvedi et al. |
| 2013/0343396 A1 | 12/2013 | Yamashita et al. |
| 2014/0007181 A1 | 1/2014 | Sarin et al. |
| 2014/0022894 A1 | 1/2014 | Oikawa et al. |
| 2014/0096229 A1 | 4/2014 | Burns et al. |
| 2014/0137240 A1 | 5/2014 | Smith et al. |
| 2014/0153577 A1 | 6/2014 | Janakiraman et al. |
| 2014/0157352 A1 | 6/2014 | Paek et al. |
| 2014/0250524 A1 | 9/2014 | Meyers et al. |
| 2014/0282027 A1 | 9/2014 | Gao et al. |
| 2014/0282518 A1 | 9/2014 | Banerjee |
| 2014/0283030 A1 | 9/2014 | Moore et al. |
| 2014/0310765 A1 | 10/2014 | Stuntebeck et al. |
| 2014/0344435 A1 | 11/2014 | Mortimore, Jr. et al. |
| 2015/0047046 A1 | 2/2015 | Pavlyushchik |
| 2015/0058983 A1 | 2/2015 | Zeitlin et al. |
| 2015/0082417 A1 | 3/2015 | Bhagwat et al. |
| 2015/0124606 A1 | 5/2015 | Alvarez et al. |
| 2015/0163088 A1 | 6/2015 | Anschutz |
| 2015/0180894 A1 | 6/2015 | Sadovsky et al. |
| 2015/0229641 A1 | 8/2015 | Sun et al. |
| 2015/0249676 A1 | 9/2015 | Koyanagi et al. |
| 2015/0269383 A1 | 9/2015 | Lang et al. |
| 2015/0295943 A1 | 10/2015 | Malachi |
| 2016/0028851 A1 | 1/2016 | Shieh |
| 2016/0191466 A1 | 6/2016 | Pemicha |
| 2016/0191545 A1 | 6/2016 | Nanda et al. |
| 2016/0203331 A1 | 7/2016 | Khan et al. |
| 2016/0269442 A1 | 9/2016 | Shieh |
| 2016/0294774 A1 | 10/2016 | Woolward et al. |
| 2016/0294875 A1 | 10/2016 | Lian et al. |
| 2016/0323245 A1 | 11/2016 | Shieh et al. |
| 2016/0337390 A1 | 11/2016 | Sridhara et al. |
| 2016/0350105 A1 | 12/2016 | Kumar et al. |
| 2017/0005986 A1 | 1/2017 | Bansal et al. |
| 2017/0063795 A1 | 3/2017 | Lian et al. |
| 2017/0134422 A1 | 5/2017 | Shieh et al. |
| 2017/0168864 A1 | 6/2017 | Ross et al. |
| 2017/0180421 A1 | 6/2017 | Shieh et al. |
| 2017/0195454 A1 | 7/2017 | Shieh |
| 2017/0208100 A1 | 7/2017 | Lian et al. |
| 2017/0223033 A1 | 8/2017 | Wager et al. |
| 2017/0223038 A1 | 8/2017 | Wager et al. |
| 2017/0279770 A1 | 9/2017 | Woolward et al. |
| 2017/0339188 A1* | 11/2017 | Jain ................... H04L 63/0428 |
| 2017/0374032 A1 | 12/2017 | Woolward et al. |
| 2018/0005296 A1 | 1/2018 | Eades et al. |
| 2018/0191779 A1 | 7/2018 | Shieh et al. |

FOREIGN PATENT DOCUMENTS

| | | |
|---|---|---|
| TW | 201642618 A | 12/2016 |
| TW | 201703483 A | 1/2017 |
| TW | 201703485 A | 1/2017 |
| WO | WO2002098100 | 12/2002 |
| WO | WO2016148865 A1 | 9/2016 |
| WO | WO2016160523 A1 | 10/2016 |
| WO | WO2016160533 A1 | 10/2016 |
| WO | WO2016160595 A1 | 10/2016 |
| WO | WO2016160599 A1 | 10/2016 |
| WO | WO2017100365 A1 | 6/2017 |

OTHER PUBLICATIONS

Final Office Action, dated Dec. 4, 2015, U.S. Appl. No. 14/673,640, filed Mar. 30, 2015.

Notice of Allowance, dated Feb. 16, 2016, U.S. Appl. No. 14/673,640, filed Mar. 30, 2015.

Non-Final Office Action, dated Jul. 7, 2015, U.S. Appl. No. 14/673,679, filed Mar. 30, 2015.

Non-Final Office Action, dated Jul. 16, 2015, U.S. Appl. No. 14/677,827, filed Apr. 2, 2015.

Final Office Action, dated Dec. 2, 2015, U.S. Appl. No. 14/677,827, filed Apr. 2, 2015.

Non-Final Office Action, dated Nov. 19, 2014, U.S. Appl. No. 13/363,082, filed Jan. 31, 2012.

Final Office Action, dated Apr. 30, 2015, U.S. Appl. No. 13/363,082, filed Jan. 31, 2012.

Notice of Allowance, dated Aug. 12, 2015, U.S. Appl. No. 13/363,082, filed Jan. 31, 2012.

Non-Final Office Action, dated Jan. 23, 2015, U.S. Appl. No. 13/847,881, filed Mar. 20, 2013.

Final Office Action, dated May 13, 2015, U.S. Appl. No. 13/847,881, filed Mar. 20, 2013.

Notice of Allowance, dated Nov. 9, 2015, U.S. Appl. No. 13/847,881, filed Mar. 20, 2013.

Non-Final Office Action, dated May 1, 2015, U.S. Appl. No. 13/860,404, filed Apr. 10, 2014.

Final Office Action, dated Dec. 3, 2015, U.S. Appl. No. 13/860,404, filed Apr. 10, 2014.

Non-Final Office Action, dated Aug. 12, 2014, U.S. Appl. No. 13/861,220, filed Apr. 11, 2013.

Final Office Action, dated Jan. 23, 2015, U.S. Appl. No. 13/861,220, filed Apr. 11, 2013.

Non-Final Office Action, dated May 18, 2015, U.S. Appl. No. 13/861,220, filed Apr. 11, 2013.

Non-Final Office Action, dated Jan. 28, 2016, U.S. Appl. No. 14/877,836, filed Oct. 7, 2015.

Non-Final Office Action, dated May 18, 2016, U.S. Appl. No. 14/964,318, filed Dec. 9, 2015.

(56) References Cited

OTHER PUBLICATIONS

Non-Final Office Action, dated Jul. 6, 2016, U.S. Appl. No. 15/151,303, filed May 10, 2016.
Final Office Action, dated Jul. 7, 2016, U.S. Appl. No. 14/877,836, filed Oct. 7, 2015.
Non-Final Office Action, dated Jul. 25, 2016, U.S. Appl. No. 15/090,523, filed Apr. 4, 2016.
Notice of Allowance, dated Jul. 27, 2016, U.S. Appl. No. 15/080,519, filed Mar. 24, 2016.
Non-Final Office Action, dated Aug. 2, 2016, U.S. Appl. No. 14/657,210, filed Mar. 13, 2015.
Non-Final Office Action, dated Sep. 16, 2016, U.S. Appl. No. 15/209,275, filed Jul. 13, 2016.
Non-Final Office Action, dated Jul. 14, 2016, U.S. Appl. No. 13/860,404, filed Apr. 10, 2013.
Non-Final Office Action, dated Oct. 13, 2016, U.S. Appl. No. 15/199,605, filed Jun. 30, 2016.
"Feature Handbook: NetBrain® Enterprise Edition 6.1" NetBrain Technologies, Inc., Feb. 25, 2016, 48 pages.
Arendt, Dustin L. et al., "Ocelot: User-Centered Design of a Decision Support Visualization for Network Quarantine", IEEE Symposium on Visualization for Cyber Security (VIZSEC), Oct. 25, 2015, 8 pages.
"International Search Report" and "Written Opinion of the International Searching Authority," Patent Cooperation Treaty Application No. PCT/US2016/065451, dated Jan. 12, 2017, 20 pages.
Maniar, Neeta, "Centralized Tracking and Risk Analysis of 3rd Party Firewall Connections," SANS Institute InfoSec Reading Room, Mar. 11, 2005, 20 pages.
Hu, Hongxin et al., "Detecting and Resolving Firewall Policy Anomalies," IEEE Transactions on Dependable and Secure Computing, vol. 9, No. 3, May/Jun. 2012, pp. 318-331.
Woolward et al., "Methods and Systems for Orchestrating Physical and Virtual Switches to Enforce Security Boundaries," U.S. Appl. No. 14/677,827, filed Apr. 2, 2015.
Shieh et al., "Methods and Systems for Providing Security to Distributed Microservices," U.S. Appl. No. 14/657,282, filed Mar. 13, 2015.
Shieh et al., "Methods and Systems for Improving Analytics in Distributed Networks," U.S. Appl. No. 14/657,210, filed Mar. 13, 2015.
International Search Report dated May 3, 2016 in Patent Cooperation Treaty Application No. PCT/US2016/024116 filed Mar. 24, 2016.
International Search Report dated May 3, 2016 in Patent Cooperation Treaty Application No. PCT/US2016/024300 filed Mar. 25, 2016.
International Search Report dated May 3, 2016 in Patent Cooperation Treaty Application No. PCT/US2016/024053 filed Mar. 24, 2016.
International Search Report dated May 6, 2016 in Patent Cooperation Treaty Application No. PCT/US2016/019643 filed Feb. 25, 2016.
Dubrawsky, Ido, "Firewall Evolution—Deep Packet Inspection," Symantec, Created Jul. 28, 2003; Updated Nov. 2, 2010, symantec.com/connect/articles/firewall-evolution-deep-packet-inspection.
International Search Report dated Jun. 20, 2016 in Patent Cooperation Treaty Application No. PCT/US2016/024310 filed Mar. 25, 2016.
Non-Final Office Action, dated Jan. 5, 2017, U.S. Appl. No. 15/348,978, filed Nov. 10, 2016.
Final Office Action, dated Jan. 18, 2017, U.S. Appl. No. 13/860,404, filed Apr. 10, 2013.
Notice of Allowance, dated Feb. 1, 2017, U.S. Appl. No. 15/090,523, filed Apr. 4, 2016.
Final Office Action, dated Apr. 19, 2017, U.S. Appl. No. 15/209,275, filed Jul. 13, 2016.
Notice of Allowance, dated Apr. 21, 2017, U.S. Appl. No. 15/348,978, filed Nov. 10, 2016.
Final Office Action, dated May 3, 2017, U.S. Appl. No. 15/199,605, filed Jun. 30, 2016.
Non-Final Office Action, dated May 15, 2017, U.S. Appl. No. 14/657,210, filed Mar. 13, 2015.
Non-Final Office Action, dated May 22, 2017, U.S. Appl. No. 15/008,298, filed Jan. 27, 2016.
Non-Final Office Action, dated Jun. 19, 2017, U.S. Appl. No. 15/479,728, filed Apr. 5, 2017.
Non-Final Office Action, dated Jul. 7, 2017, U.S. Appl. No. 14/964,318, filed Dec. 9, 2015.
Non-Final Office Action, dated Jul. 19, 2017, U.S. Appl. No. 15/334,151, filed Oct. 25, 2016.

\* cited by examiner

500A

```
kubectl get services
NAME              LABELS                                          SELECTOR    IP                PORT
kubernetes-ro     component=apiserver,provider=kubernetes         <none>      10.254.47.161     80
kubernetes        component=apiserver,provider=kubernetes         <none>      10.254.153.242    443

(and at an image level)
desiredState:
    replicas: 1
    replicaSelector:
        selectorname: "webserver"
    podTemplate:
        desiredState:
            manifest:
                version: "v1beta1"
                id: "webserver-controller"
                containers:
                    - name: "apache-frontend"
                      image: "webwithdb"
                      ports:
                          - containerPort: 80
                            hostPort: 80
```

FIG. 5A

| Service Type | Protocols/Common Ports | Target (allowed communication partners) | Direction | Application Payload / Message Semantics |
|---|---|---|---|---|
| Web Server (IIS, Apache) | HTTP/80 | User Devices | Incoming | HTTP |
| | SMB (tcp/445), NFS (tcp/2049) | File Servers | Outbound | SMB, NFS |
| | Common secure mgmt applications | Infrastructure Mgmt devices | Incoming | Ssh, ICMP |
| File Server (HFS) | HTTP/80 | application servers | incoming | http1.1 and above, SMB, NFS |
| | Common secure mgmt applications | Infrastructure Mgmt devices | Incoming | Ssh, ICMP |
| Postgress SQL server | tcp/5432 | application servers | incoming | postgress SQL |
| | tcp/5432 | postgres SQL servers | incoming / outbound | postgres SQL replication |
| | Common secure mgmt applications | Infrastructure Mgmt devices | Incoming | Ssh, ICMP |
| | iscsi tcp/860 | iSCSI target | Outgoing | iscsi |
| iSCSI Server (Openfiler) | iscsi/860 | postgres SQL servers | Incoming | iscsi |
| | Common secure mgmt applications | Infrastructure Mgmt devices | Incoming | Ssh, ICMP |
| RabbitMQ | amqp tcp/5672 | application servers | incoming | amqp 0.9.1 or obove |
| | Common secure mgmt applications | Infrastructure Mgmt devices | Incoming | Ssh, ICMP |
| | dns tcp, udp/53 | DNS servers | Outbound | DNS name resolution |
| OpenDNS | dns tcp,udp/53 | Any | Inbound/outbound | DNS name resolution |
| | Common secure mgmt applications | Infrastructure Mgmt devices | Incoming | Ssh, ICMP |
| | dhcp udp/67-68 | Any | Incoming / Outbound | DHCP |

FIG. 5B

SECURITY POLICY GENERATION FOR VIRTUALIZATION, BARE-METAL SERVER, AND CLOUD COMPUTING ENVIRONMENTS

CROSS REFERENCE TO RELATED APPLICATIONS

This application is a continuation-in-part of application Ser. No. 15/192,967 filed on Jun. 24, 2016, now U.S Pat. No. 9,560,081, issued Jan. 31, 2017, which is hereby incorporated by reference for all purposes.

FIELD OF THE INVENTION

The present technology pertains to computer security, and more specifically to computer network security.

BACKGROUND ART

A hardware firewall is a network security system that controls incoming and outgoing network traffic. A hardware firewall generally creates a barrier between an internal network (assumed to be trusted and secure) and another network (e.g., the Internet) that is assumed not to be trusted and secure.

Attackers breach internal networks to steal critical data. For example, attackers target low-profile assets to enter the internal network. Inside the internal network and behind the hardware firewall, attackers move laterally across the internal network, exploiting East-West traffic flows, to critical enterprise assets. Once there, attackers siphon off valuable company and customer data.

SUMMARY OF THE INVENTION

Some embodiments of the present technology include computer-implemented methods for security in virtualization environments which may include: receiving network traffic associated with a primary workload; generating first metadata using the network traffic; determining a primary categorization associated with the primary workload, using the first metadata; confirming the primary categorization is reliable; determining a secondary categorization associated with at least one secondary workload, the at least one secondary workload being communicatively coupled to the primary workload; ascertaining the primary categorization and the secondary categorization are consistent with each other and are each stable; producing a model using the primary categorization and the secondary categorization, the model including a behavior and a relationship associated with the primary workload; checking the model for sustained convergence; and generating a high-level declarative security policy associated with the primary workload using the model, the high-level declarative security policy indicating at least an application or service with which the primary workload can communicate.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 5A illustrates example metadata, according to various embodiments.

FIG. 5B is a table of example expected behaviors in accordance with some embodiments.

DETAILED DESCRIPTION

Figure 1:
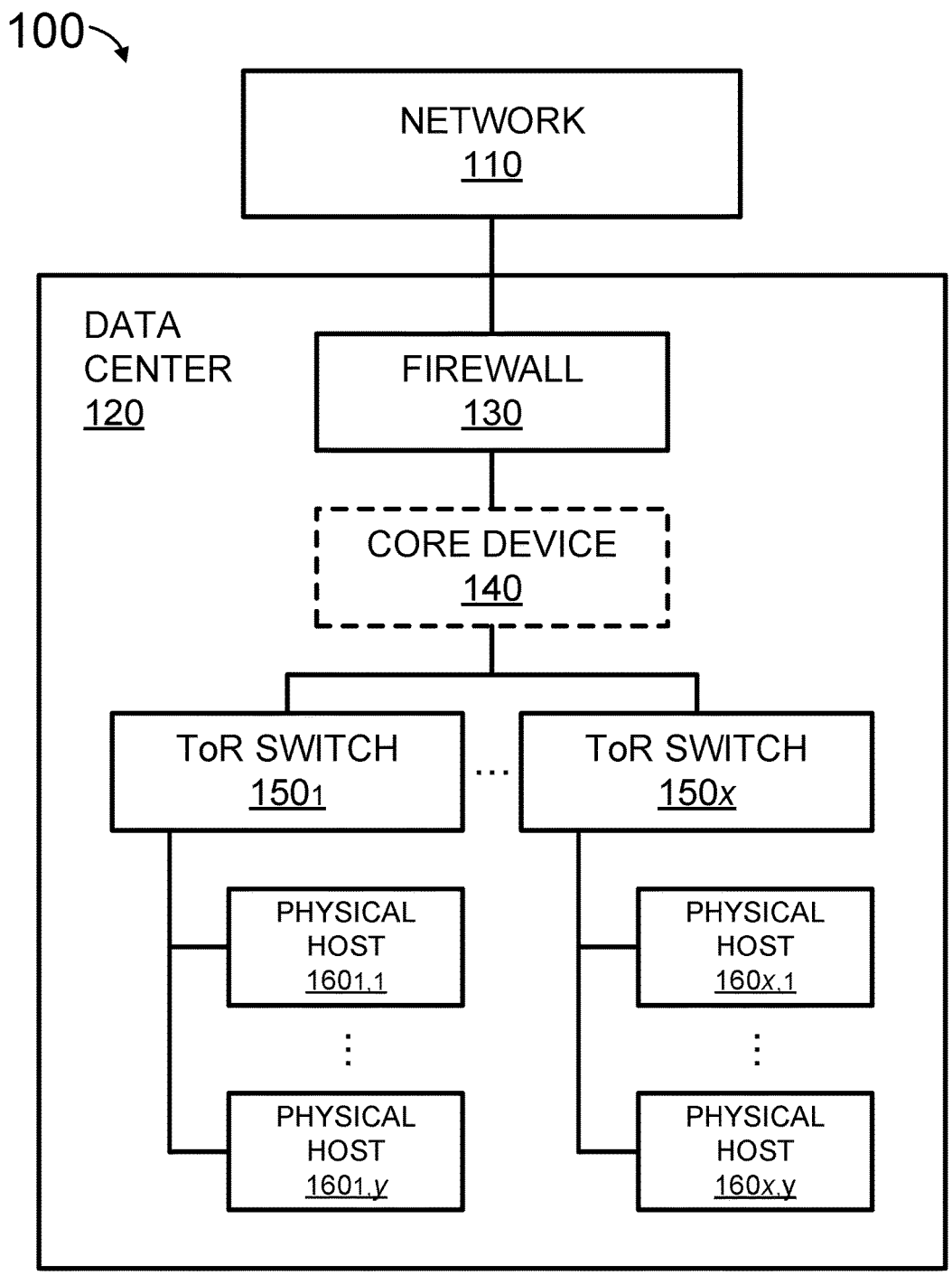
FIG. 1 is a simplified block diagram of an (physical) environment, according to some embodiments.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated. The terminology used herein is for the purpose of describing particular embodiments only and is not intended to be limiting of the technology. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof. It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Information technology (IT) organizations face cyber threats and advanced attacks. Firewalls are an important part of network security. Firewalls control incoming and outgoing network traffic using a rule set. A rule, for example, allows a connection to a specific (Internet Protocol (IP)) address (and/or port), allows a connection to a specific (IP) address (and/or port) if the connection is secured (e.g., using Internet Protocol security (IPsec)), blocks a connection to a specific (IP) address (and/or port), redirects a connection from one IP address (and/or port) to another IP address (and/or port), logs communications to and/or from a specific IP address (and/or port), and the like. A firewall rule at a low level of abstraction may indicate a specific (IP) address and protocol to which connections are allowed and/or not allowed.

Managing a set of firewall rules is a difficult challenge. Some IT security organizations have a large staff (e.g., dozens of staff members) dedicated to maintaining firewall policy (e.g., a firewall rule set). A firewall rule set can have tens of thousands or even hundreds of thousands of rules. Some embodiments of the present technology may autonomically generate a reliable declarative security policy at a high level of abstraction. Abstraction is a technique for managing complexity by establishing a level of complexity which suppresses the more complex details below the current level. The high-level declarative policy may be compiled to produce a firewall rule set at a low level of abstraction.

FIG. 1 illustrates a system 100 according to some embodiments. System 100 includes network 110 and data center 120. In various embodiments, data center 120 includes firewall 130, optional core switch/router (also referred to as a core device) 140, Top of Rack (ToR) switches $150_1$-$150_x$, and physical hosts $160_{1,1}$-$160_{x,y}$.

Network 110 (also referred to as a computer network or data network) is a telecommunications network that allows computers to exchange data. For example, in network 110, networked computing devices pass data to each other along data connections (e.g., network links). Data can be transferred in the form of packets. The connections between nodes may be established using either cable media or wireless media. For example, network 110 includes at least one of a local area network (LAN), wireless local area network (WLAN), wide area network (WAN), metropolitan area network (MAN), and the like. In some embodiments, network 110 includes the Internet.

Data center 120 is a facility used to house computer systems and associated components. Data center 120, for example, comprises computing resources for cloud computing services or operated for the benefit of a particular organization. Data center equipment, for example, is generally mounted in rack cabinets, which are usually placed in single rows forming corridors (e.g., aisles) between them. Firewall 130 creates a barrier between data center 120 and network 110 by controlling incoming and outgoing network traffic based on a rule set.

Optional core switch/router 140 is a high-capacity switch/router that serves as a gateway to network 110 and provides communications between ToR switches $150_1$ and $150_x$, and between ToR switches $150_1$ and $150_x$ and network 110. ToR switches $150_1$ and $150_x$ connect physical hosts $160_{1,1}$-$160_{1,y}$ and $160_{x,1}$-$160_{x,y}$ (respectively) together and to network 110 (optionally through core switch/router 140). For example, ToR switches $150_1$-$150_x$ use a form of packet switching to forward data to a destination physical host (of physical hosts $160_{1,1}$-$160_{x,y}$) and (only) transmit a received message to the physical host for which the message was intended.

In some embodiments, physical hosts $160_{1,1}$-$160_{x,y}$ are computing devices that act as computing servers such as blade servers. Computing devices are described further in relation to FIG. 7. For example, physical hosts $160_{1,1}$-$160_{x,y}$ comprise physical servers performing the operations described herein, which can be referred to as a bare-metal server environment. Additionally or alternatively, physical hosts $160_{1,1}$-$160_{x,y}$ may be a part of a cloud computing environment. Cloud computing environments are described further in relation to FIG. 7. By way of further non-limiting example, physical hosts $160_{1,1}$-$160_{x,y}$ can host different combinations and permutations of virtual and container environments (which can be referred to as a virtualization environment), which are described further below in relation to FIGS. 2-4.

Figure 2:
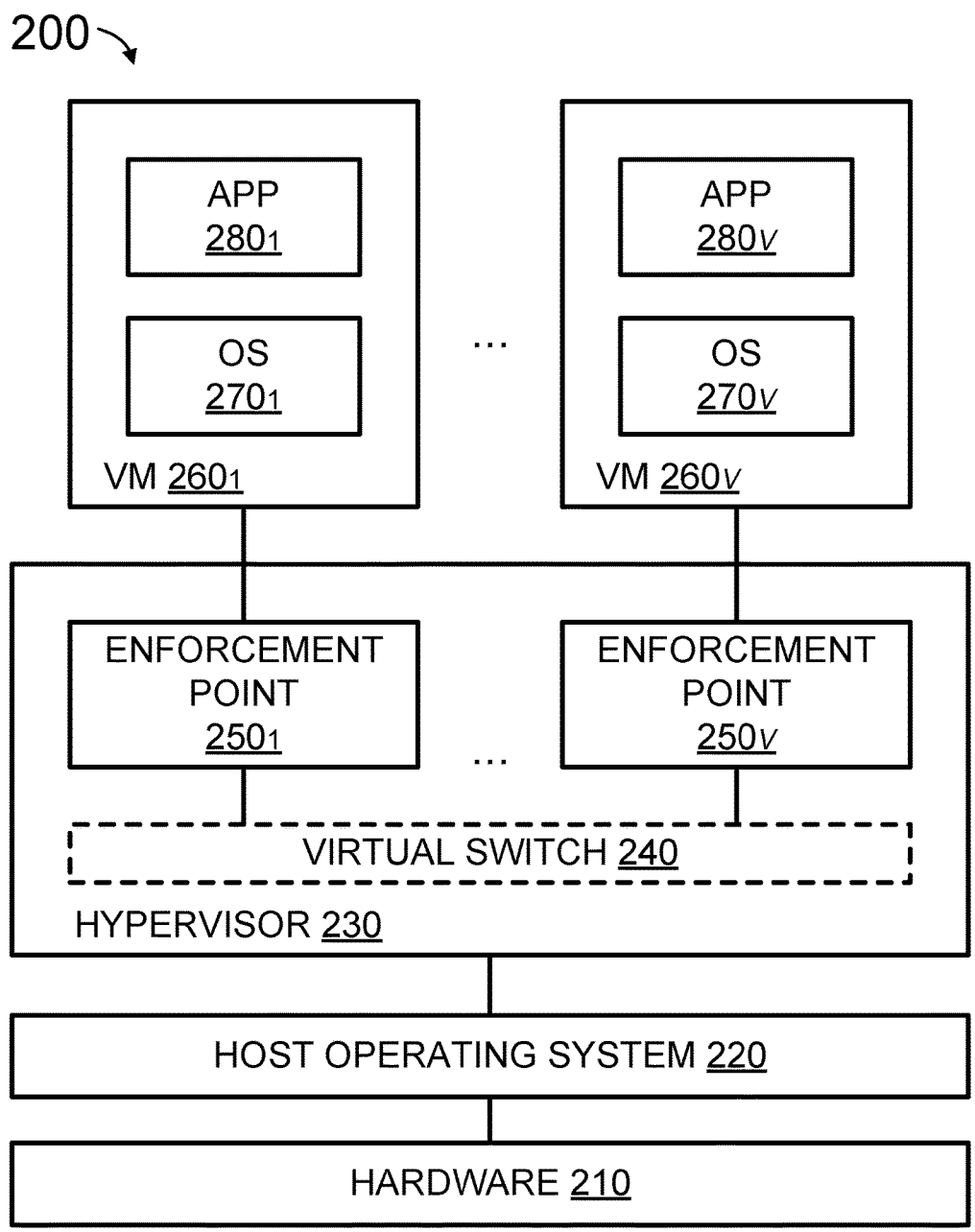
FIG. 2 is simplified block diagram of an (virtual) environment, in accordance with various embodiments.

FIG. 2 depicts (virtual) environment 200 according to various embodiments. In some embodiments, (virtual) environment 200 is implemented in at least one of physical hosts $160_{1,1}$-$160_{x,y}$ (FIG. 1). (Virtual) Environment 200 includes hardware 210, host operating system (OS) 220, hypervisor 230, and virtual machines (VMs) $260_1$-$260_V$. In some embodiments, hardware 210 is implemented in at least one of physical hosts $160_{1,1}$-$160_{x,y}$ (FIG. 1). Host operating system 220 can run on hardware 210 and can also be referred to as the host kernel. Hypervisor 230 optionally includes virtual switch 240 and includes enforcement points $250_1$-$250_V$. VMs $260_1$-$260_V$ each include a respective one of operating systems (OSes) $270_1$-$270_V$ and applications (APPs) $280_1$-$280_V$.

Hypervisor (also known as a virtual machine monitor (VMM)) 230 is software running on at least one of physical hosts $160_{1,1}$-$160_{x,y}$, and hypervisor 230 runs VMs $260_1$-$260_V$. A physical host (of physical hosts $160_{1,1}$-$160_{x,y}$) on which hypervisor 230 is running one or more virtual machines $260_1$-$260_V$, is also referred to as a host machine. Each VM can also be referred to as a guest machine.

For example, hypervisor 230 allows multiple OSes $270_1$-$270_V$ to share a single physical host (of physical hosts $160_{1,1}$-$160_{x,y}$). Each of OSes $270_1$-$270_V$ appears to have the host machine's processor, memory, and other resources all to itself. However, hypervisor 230 actually controls the host machine's processor and resources, allocating what is needed to each operating system in turn and making sure that the guest OSes (e.g., virtual machines $260_1$-$260_V$) cannot disrupt each other. OSes $270_1$-$270_V$ are described further in relation to FIG. 7.

VMs $260_1$-$260_V$ also include applications $280_1$-$280_V$. Applications (and/or services) $280_1$-$280_V$ are programs designed to carry out operations for a specific purpose. Applications $280_1$-$280_V$ can include at least one of web application (also known as web apps), web server, transaction processing, database, and the like software. Applications $280_1$-$280_V$ run using a respective OS of OSes $270_1$-$270_V$.

Hypervisor 230 optionally includes virtual switch 240. Virtual switch 240 is a logical switching fabric for networking VMs $260_1$-$260_V$. For example, virtual switch 240 is a program running on a physical host (of physical hosts $160_{1,1}$-$160_{x,y}$) that allows a VM (of VMs $260_1$-$260_V$) to communicate with another VM.

Hypervisor 230 also includes enforcement points $250_1$-$250_V$, according to some embodiments. For example, enforcement points $250_1$-$250_V$ are a firewall service that provides network traffic filtering and monitoring for VMs $260_1$-$260_V$ and containers (described below in relation to FIGS. 3 and 4). Enforcement points $250_1$-$250_V$ are described further in related United States Patent Application "Methods and Systems for Orchestrating Physical and Virtual Switches to Enforce Security Boundaries" (application Ser. No. 14/677,827) filed Apr. 2, 2015, which is hereby incorporated by reference for all purposes. Although enforcement points $250_1$-$250_V$ are shown in hypervisor 230, enforcement points $250_1$-$250_V$ can additionally or alternatively be realized in one or more containers (described below in relation to FIGS. 3 and 4).

According to some embodiments, enforcement points $250_1$-$250_V$ control network traffic to and from a VM (of VMs $260_1$-$260_V$) (and/or a container) using a rule set. A rule, for example, allows a connection to a specific (IP) address, allows a connection to a specific (IP) address if the connection is secured (e.g., using IPsec), denies a connection to a specific (IP) address, redirects a connection from one IP address to another IP address (e.g., to a honeypot or tar pit), logs communications to and/or from a specific IP address, and the like. Each address is virtual, physical, or both. Connections are incoming to the respective VM (or a container), outgoing from the respective VM (or container), or both. Redirection is described further in related United States Patent Application "System and Method for Threat-Driven Security Policy Controls" (application Ser. No. 14/673,679) filed Mar. 30, 2015, which is hereby incorporated by reference for all purposes.

In some embodiments logging includes metadata associated with action taken by enforcement point 250 (of enforcement points $250_1$-$250_V$), such as the permit, deny, and log behaviors. For example, for a Domain Name System (DNS) request, metadata associated with the DNS request, and the action taken (e.g., permit/forward, deny/block, redirect, and log behaviors) are logged. Activities associated with other (application-layer) protocols (e.g., Dynamic Host Configuration Protocol (DHCP), Domain Name System (DNS), File Transfer Protocol (FTP), Hypertext Transfer Protocol (HTTP), Internet Message Access Protocol (IMAP), Post Office Protocol (POP), Secure Shell (SSH), Secure Sockets Layer (SSL), Transport Layer Security (TLS), and the like) and their respective metadata may be additionally or alternatively logged. For example, metadata further includes at least one of a source (IP) address and/or hostname, a source port, destination (IP) address and/or hostname, a destination port, protocol, application, and the like.

Figure 3:
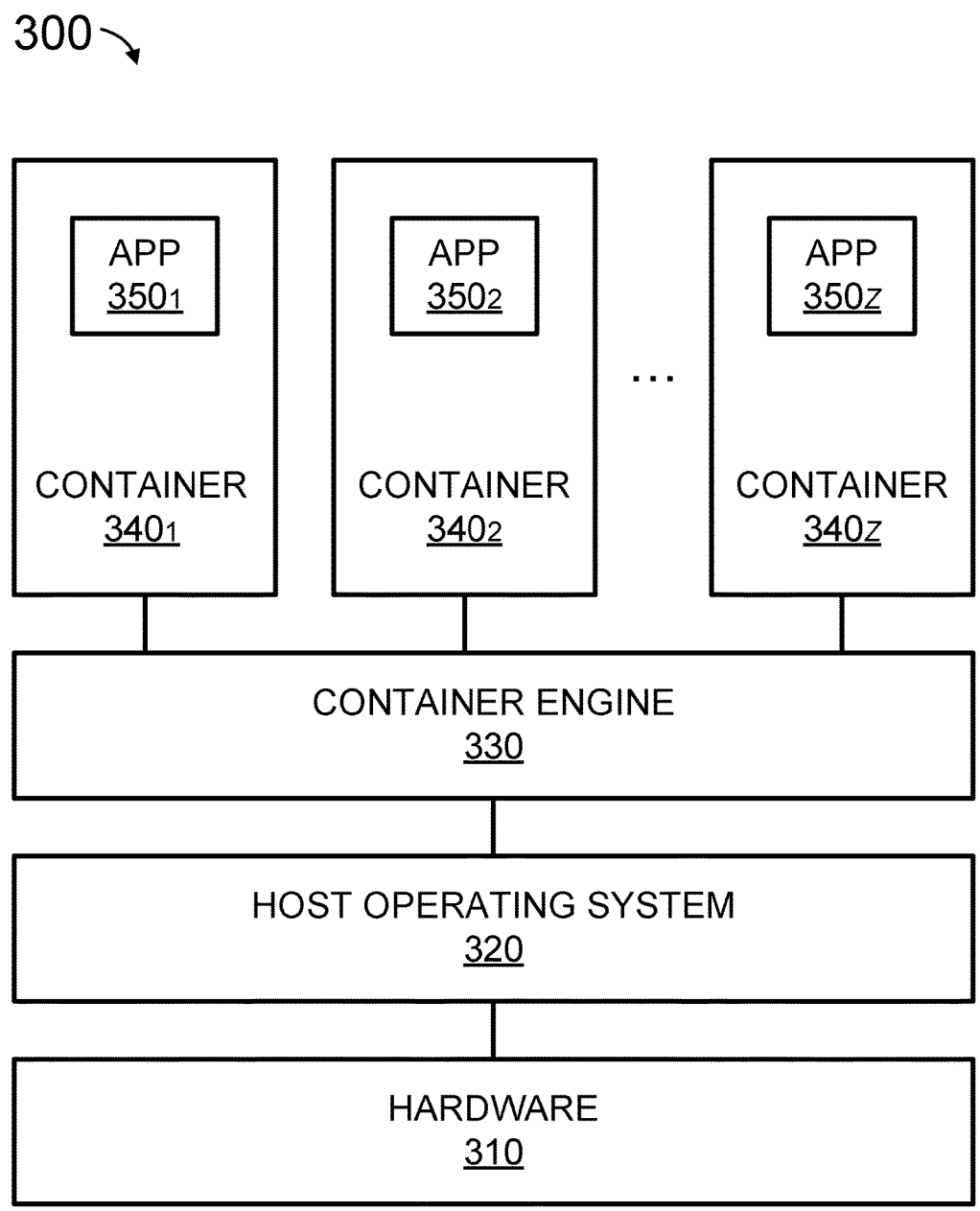
FIG. 3 is simplified block diagram of an environment, according to various embodiments.

FIG. 3 depicts environment 300 according to various embodiments. Environment 300 includes hardware 310, host operating system 320, container engine 330, and containers $340_1$-$340_z$. In some embodiments, hardware 310 is implemented in at least one of physical hosts $160_{1,1}$-$160_{x,y}$ (FIG. 1). Host operating system 320 runs on hardware 310 and can also be referred to as the host kernel. By way of non-limiting example, host operating system 320 can be at least one of: Linux, Red Hat® Enterprise Linux® Atomic Enterprise Platform, CoreOS®, Ubuntu® Snappy, Pivotal Cloud Foundry®, Oracle® Solaris, and the like. Host operating system 320 allows for multiple (instead of just one) isolated user-space instances (e.g., containers $340_1$-$340_z$) to run in host operating system 320 (e.g., a single operating system instance).

Host operating system 320 can include a container engine 330. Container engine 330 can create and manage containers $340_1$-$340_z$, for example, using an (high-level) application programming interface (API). By way of non-limiting example, container engine 330 is at least one of Docker®, Rocket (rkt), Solaris Containers, and the like. For example, container engine 330 may create a container (e.g., one of containers $340_1$-$340_z$) using an image. An image can be a (read-only) template comprising multiple layers and can be built from a base image (e.g., for host operating system 320) using instructions (e.g., run a command, add a file or directory, create an environment variable, indicate what process (e.g., application or service) to run, etc.). Each image may be identified or referred to by an image type. In some embodiments, images (e.g., different image types) are stored and delivered by a system (e.g., server side application) referred to as a registry or hub (not shown in FIG. 3).

Container engine 330 can allocate a filesystem of host operating system 320 to the container and add a read-write layer to the image. Container engine 330 can create a network interface that allows the container to communicate with hardware 310 (e.g., talk to a local host). Container engine 330 can set up an Internet Protocol (IP) address for the container (e.g., find and attach an available IP address from a pool). Container engine 330 can launch a process (e.g., application or service) specified by the image (e.g., run an application (APP), such as one of APPs $350_1$-$350_z$, described further below). Container engine 330 can capture and provide application output for the container (e.g., connect and log standard input, outputs and errors). The above examples are only for illustrative purposes and are not intended to be limiting.

Containers $340_1$-$340_z$ can be created by container engine 330. In some embodiments, containers $340_1$-$340_z$ are each an environment as close as possible to an installation of host operating system 320, but without the need for a separate kernel. For example, containers $340_1$-$340_z$ share the same operating system kernel with each other and with host operating system 320. Each container of containers $340_1$-$340_z$ can run as an isolated process in user space on host operating system 320. Shared parts of host operating system 320 can be read only, while each container of containers $340_1$-$340_z$ can have its own mount for writing.

Containers $340_1$-$340_z$ can include one or more APPs $350_1$-$350_z$, (and all of their respective dependencies). APPs $350_1$-$350_z$, can be any application or service. By way of non-limiting example, APPs $350_1$-$350_z$, can be a database (e.g., Microsoft® SQL Server®, MongoDB, HTFS, etc.), email server (e.g., Sendmail®, Postfix, qmail, Microsoft® Exchange Server, etc.), message queue (e.g., Apache® Qpid™, RabbitMQ®, etc.), web server (e.g., Apache® HTTP Server™, Microsoft® Internet Information Services (IIS), Nginx, etc.), Session Initiation Protocol (SIP) server (e.g., Kamailio® SIP Server, Avaya® Aura® Application Server 5300, etc.), other media server (e.g., video and/or audio streaming, live broadcast, etc.), file server (e.g., Linux server, Microsoft® Windows Server®, etc.), service-oriented architecture (SOA) and/or microservices process, object-based storage (e.g., Lustre®, EMC® Centera®, Scality® RING®, etc.), directory service (e.g., Microsoft® Active Directory®, Domain Name System (DNS) hosting service, etc.), and the like.

Each of VMs $260_1$-$260_V$ (FIG. 2) and containers $340_1$-$340_z$ can be referred to as workloads and/or endpoints. In contrast to hypervisor-based virtualization VMs $260_1$-$260_V$, containers $340_1$-$340_z$ may be an abstraction performed at the operating system (OS) level, whereas VMs are an abstraction of physical hardware. Since VMs $260_1$-$260_V$ can virtualize hardware, each VM instantiation of VMs $260_1$-$260_V$ can have a full server hardware stack from virtualized Basic Input/Output System (BIOS) to virtualized network adapters, storage, and central processing unit (CPU). The entire hardware stack means that each VM of VMs $260_1$-$260_V$ needs its own complete OS instantiation and each VM must boot the full OS.

Figure 4:
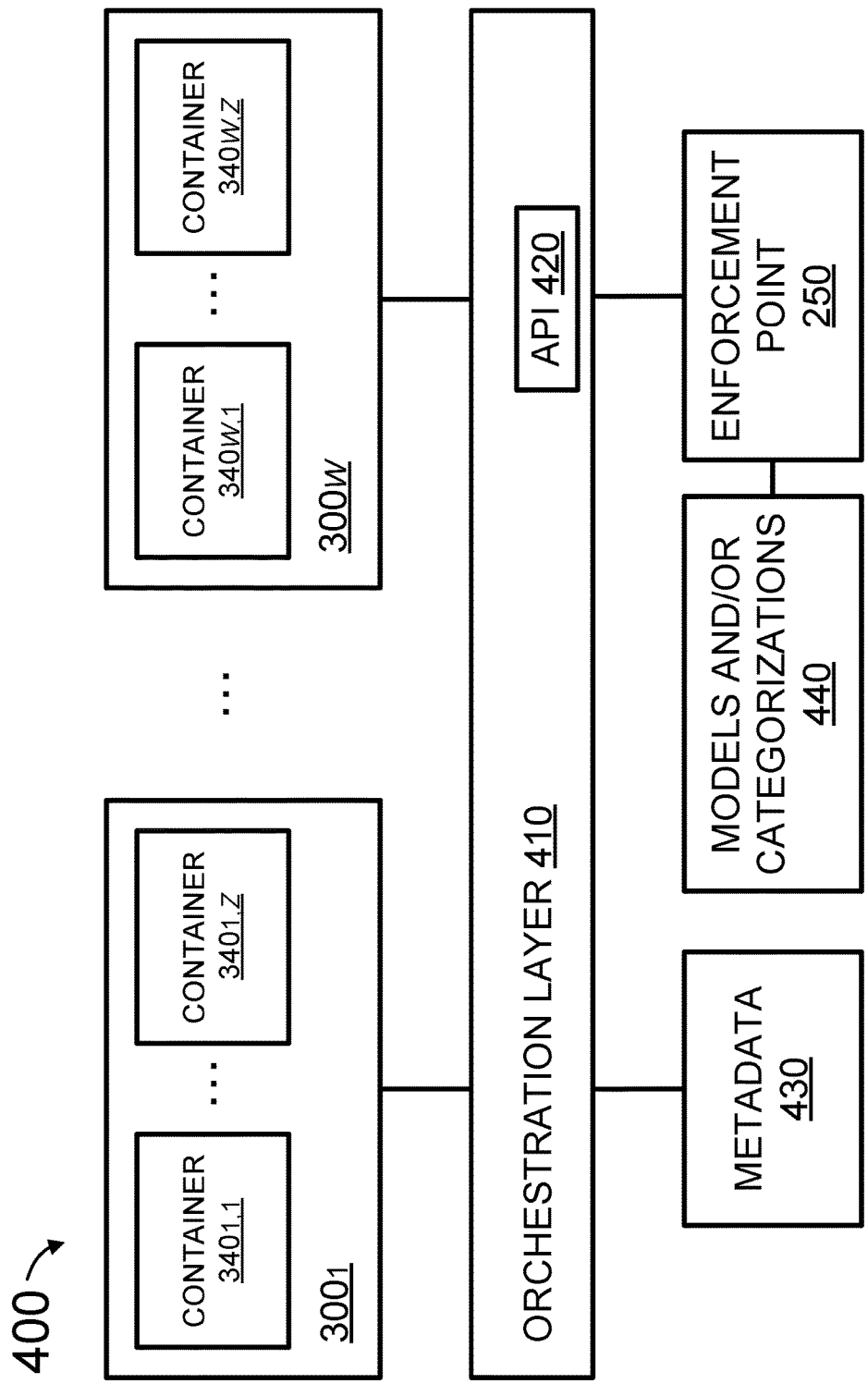
FIG. 4 is a simplified block diagram of an environment, in accordance with some embodiments.

FIG. 4 illustrates environment 400, according to some embodiments. Environment 400 can include one or more of enforcement point 250, environments $300_1$-$300_W$, orchestration layer 410, metadata 430, and models (and/or categorizations) 440. Enforcement point 250 can be an enforcement point as described in relation to enforcement points $250_1$-$250_V$ (FIG. 2). Environments $300_1$-$300_W$ can be instances of environment 300 (FIG. 3), include containers $340_{1,1}$-$340_{1,Z}$ and $340_{W,1}$-$340_{W,Z}$, (referred to collectively as containers $340_{1,1}$-$340_{W,Z}$), and be in at least one of data center 120 (FIG. 1). Containers $340_{1,1}$-$340_{W,Z}$ (e.g., in a respective environment of environments $300_1$-$300_W$) can be a container as described in relation to containers $340_1$-$340_z$ (FIG. 3).

Orchestration layer 410 can manage and deploy containers $340_{1,1}$-$340_{W,Z}$ across one or more environments $300_1$-$300_W$ in one or more data centers of data center 120 (FIG. 1). In some embodiments, to manage and deploy containers $340_{1,1}$-$340_{W,Z}$, orchestration layer 410 receives one or more image types (e.g., named images) from a data storage and content delivery system referred to as a registry or hub (not shown in FIG. 4). By way of non-limiting example, the registry can be the Google Container Registry. In various embodiments, orchestration layer 410 determines which environment of environments $300_1$-$300_W$ should receive each container of containers $340_{1,1}$-$340_{W,Z}$ (e.g., based on the environments' $300_1$-$300_W$ current workload and a given redundancy target). Orchestration layer 410 can provide means of discovery and communication between containers $340_{1,1}$-$340_{W,Z}$. According to some embodiments, orchestration layer 410 runs virtually (e.g., in one or more containers $340_{1,1}$-$340_{W,Z}$ orchestrated by a different one of orchestration layer 410 and/or in one or more of hypervisor 230 (FIG. 2)) and/or physically (e.g., in one or more physical hosts of physical hosts $160_{1,1}$-$160_{x,y}$ (FIG. 1)) in one or more of data center 120. By way of non-limiting example, orchestration layer 410 is at least one of Docker Swarm®, Kubernetes®, Cloud Foundry® Diego, Apache® Mesos™, and the like.

Orchestration layer 410 can maintain (e.g., create and update) metadata 430. Metadata 430 can include reliable and authoritative metadata concerning containers (e.g., containers $340_{1,1}$-$340_{W,Z}$). FIG. 5A illustrates metadata example 500A, a non-limiting example of metadata 430 (FIG. 4). By way of illustration, metadata example 500A indicates for a container at least one of: an image name (e.g., file name including at least one of a network device (such as a host, node, or server) that contains the file), hardware device or drive, directory tree (such as a directory or path), base name of the file, type (such as format or extension) indicating the content type of the file, and version (such as revision or generation number of the file), an image type (e.g., including name of an application or service running), the machine with which the container is communicating (e.g., IP address, host name, etc.), and a respective port through which the container is communicating, and other tag and/or label (e.g., a (user-configurable) tag or label such as a Kubernetes® tag, Docker® label, etc.), and the like. In various embodiments, metadata 430 is generated by orchestration layer 410—which manages and deploys containers—and can be very timely (e.g., metadata is available soon after an associated container is created) and highly reliable (e.g., accurate). In addition or alternative to metadata example 500A, other metadata may comprise metadata 430 (FIG. 4). For example, other elements (e.g., service name, (user-configurable) tag and/or label, and the like) associated with models 440 are used. By way of further non-limiting example, metadata 430 includes an application determination using application identification (AppID). AppID can process data packets at a byte level and can employ signature analysis, protocol analysis, heuristics, and/or behavioral analysis to identify an application and/or service. In some embodiments, AppID inspects only a part of a data payload (e.g., only parts of some of the data packets). By way of non-limiting example, AppID is at least one of Cisco Systems® OpenAppID, Qosmos ixEngine®, Palo Alto Networks® APP-ID™, and the like.

Referring back to FIG. 4, enforcement point 250 can receive metadata 430, for example, through application programming interface (API) 420. Other interfaces can be used to receive metadata 430. In some embodiments, enforcement point 250 can include models 440. Models 440 can include a model(s) of expected (network communications) behavior(s) for an image type(s). For example, expected (network communications) behaviors can include at least one of: protocols and/or ports that should be used by a container and who the container should talk to (e.g., relationships between containers, such as other applications and/or services the container should talk to), and the like. In some embodiments, models 440 include a model of expected (network communications) behavior for applications and/or services running in a VM (e.g., of VMs $260_1$-$260_V$ shown in FIG. 2). A model of expected behavior for an image type is described further below in relation to FIG. 5B.

Models 440 may additionally or alternatively include a model(s) for a workload(s) (or workload model). A workload model can describe behavior and relationships of a particular workload (referred to as the primary workload) with other workloads (referred to as secondary workloads). A workload model is described further below in relation to FIG. 5C.

In various embodiments, models 440 are modifiable by an operator, such that security policy is adapted to the evolving security challenges confronting the IT organization. For example, the operator provides permitted and/or forbidden (network communications) behaviors via at least one of a graphical user interface (GUI), command-line interface (CLI), application programming interface (API), and the like (not depicted in FIG. 4).

FIG. 5B shows table 500B representing non-limiting examples of expected behaviors which can be included in models 440 (FIG. 4), according to some embodiments. For example, database server 510B can be expected to communicate using transmission control protocol (TCP), common secure management applications, and Internet Small Computer System (iSCSI) TCP. By way of further non-limiting example, database server 510B can be expected to communicate with application servers, other database servers, infrastructure management devices, and iSCSI target. In some embodiments, if database server 510B were to communicate with a user device using Hypertext Transfer Protocol (HTTP), then such a deviation from expected behavior could be used at least in part to detect a security breach.

By way of additional non-limiting example, file server 520B (e.g., HTTP File Server or HFS) can be expected to communicate using HTTP and common secure management applications. For example, file server 520B can be expected to communicate with application servers and infrastructure management devices. In various embodiments, if file server 520B were to communicate with a user device using Hypertext Transfer Protocol (HTTP), then such a deviation from expected behavior could be used at least in part to detect a security breach.

Many other deviations from expected behavior are possible. Additionally, other different combinations and/or permutations of services, protocols (e.g., Advanced Message Queuing Protocol (AMQP), DNS, Dynamic Host Configuration Protocol (DHCP), Network File System (NFS), Server Message Block (SMB), User Datagram Protocol (UDP), and the like) and common ports, communication partners, direction, and application payload and/or message semantics (e.g., Secure Shell (SSH), Internet Control Message Protocol (ICMP), Structured Query Language (SQL), and the like), including ones not depicted in FIG. 5B may be used. Enforcement point 250 can be realized in at least one of a virtual and container environment.

In some embodiments, using metadata 430 and models of expected behavior (e.g., included in models 440), enforcement point 250 applies heuristics to generate a high-level declarative security policy associated with a container (e.g., of containers $340_{1,1}$-$340_{W,Z}$). A high-level security policy can comprise one or more high-level security statements, where there is one high-level security statement per allowed protocol, port, and/or relationship combination. In some embodiments, enforcement point 250 determines an image type using metadata 430 and matches the image type with one or more models of expected behavior (e.g., included in models 440) associated with the image type. For example, if/when the image type corresponds to a certain database application, then one or more models associated with that database are determined. A list of at least one of: allowed protocols, ports, and relationships for the database may be determined using the matched model(s).

In various embodiments, enforcement point 250 produces a high-level declarative security policy for the container using the list of at least one of: allowed protocols, ports, and relationships. The high-level declarative security policy can be at least one of: a statement of protocols and/or ports the container is allowed to use, indicate applications/services that the container is allowed to communicate with, and indicate a direction (e.g., incoming and/or outgoing) of permitted communications. According to some embodiments, single application/service is subsequently used to identify several different machines associated with the single application/service. The high-level declarative security policy is at a high level of abstraction, in contrast with low-level firewall rules, which are at a low level of abstraction and only identify specific machines by IP address and/or hostname. Accordingly, one high-level declarative security statement can be compiled to produce hundreds or more of low-level firewall rules.

The high-level security policy can be compiled by enforcement point 250 (or other machine) to produce a low-level firewall rule set. Compilation is described further in related United States Patent Application "Conditional Declarative Policies" (application Ser. No. 14/673,640) filed Mar. 30, 2015, which is hereby incorporated by reference for all purposes.

According to some embodiments, a low-level firewall rule set is used by enforcement point 250 to determine when the high-level security policy is (possibly) violated. For example, a database (e.g., in a container of containers $340_{1,1}$-$340_{W,Z}$) serving web pages using the Hypertext Transfer Protocol (HTTP) and/or communicating with external networks (e.g., network 110 of FIG. 1) could violate a high-level declarative security policy for that database container. In various embodiments, enforcement point 250 is an enforcement point (e.g., in a container of containers $340_{1,1}$-$340_{W,Z}$). Enforcement points are described further in related United States Patent Application "Methods and Systems for Orchestrating Physical and Virtual Switches to Enforce Security Boundaries" (application Ser. No. 14/677, 827) filed Apr. 2, 2015, now U.S. Pat. No. 9,973,472, issued May 15, 2018, which is hereby incorporated by reference for all purposes. Detection of a (potential) violation of the high-level security policy and violation handling are described further in related United States Patent Application "System and Method for Threat-Driven Security Policy Controls" (application Ser. No. 14/673,679) filed Mar. 30, 2015, now U.S. Pat. No. 9,294,442, issued Mar. 22, 2016, which is hereby incorporated by reference for all purposes. For example, when a (potential) violation of the high-level security policy is detected, enforcement point 250 (or other machine) issues an alert and/or drops/forwards network traffic that violates the high-level declarative security policy.

Figure 5C:
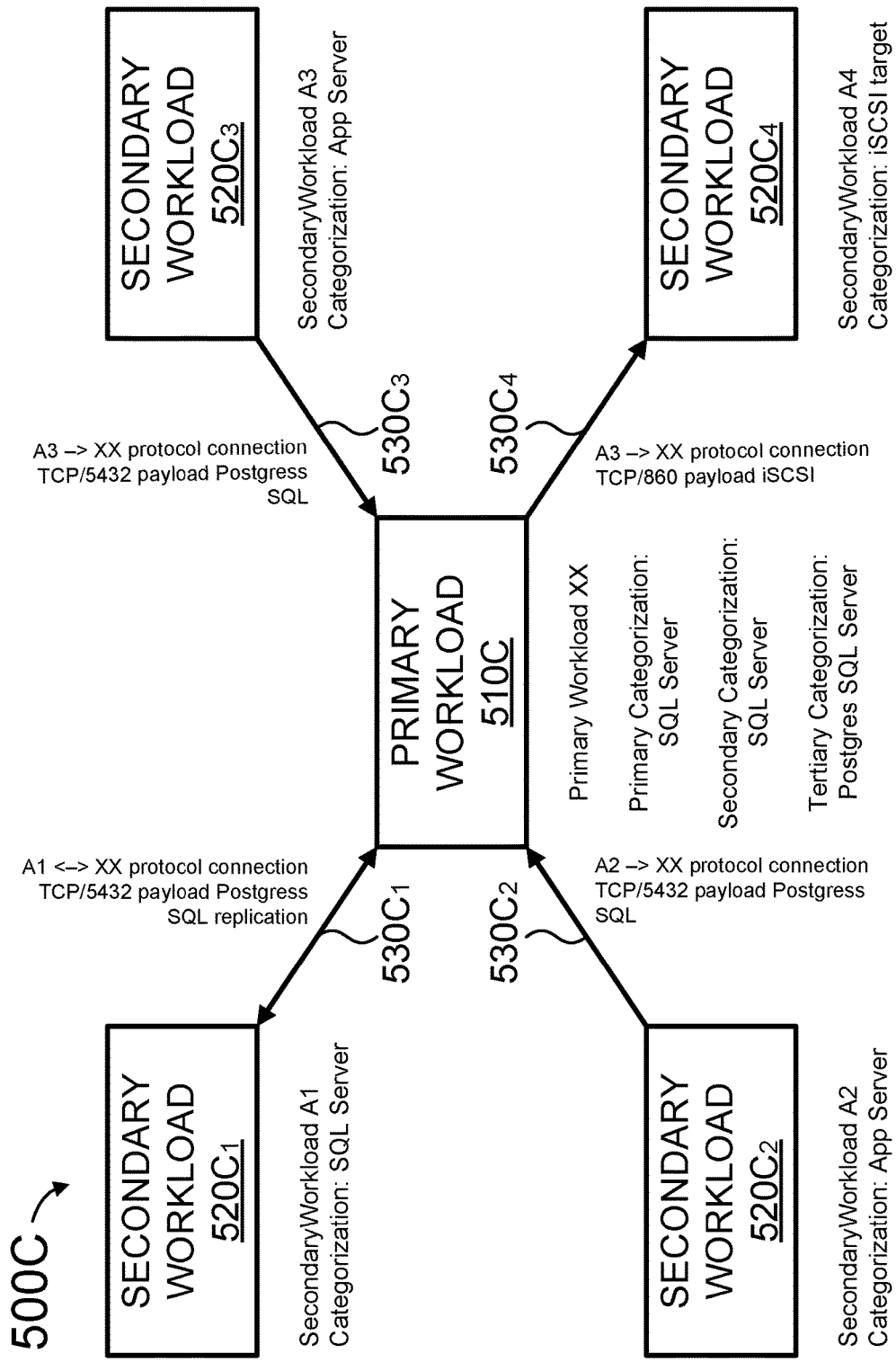
FIG. 5C depicts an example workload model in accordance with some embodiments.

FIG. 5C shows a model for a workload (or workload model) 500C which can be included in models 440 (FIG. 4), according to some embodiments. Workload model 500C can describe behavior and relationships of primary workload 510C with other workloads (e.g., secondary workloads $520C_1$-$520C_4$). By way of non-limiting example, primary workload 510C has a primary categorization of SQL Server, secondary categorization of SQL server, and tertiary categorization of Postgres SQL Server. Primary workload 510C communicates with secondary workload $520C_1$ through (protocol) connection $530C_1$, with secondary workload $520C_2$ through (protocol) connection $530C_2$, with secondary workload $520C_3$ through (protocol) connection $530C_3$, and with secondary workload $520C_4$ through (protocol) connection $530C_4$. By way of further non-limiting example, secondary workload $520C_1$ has a categorization of SQL server and (protocol) connection $530C_1$ uses TCP/5432 payload Postgres SQL replication, secondary workload $520C_2$ has a categorization of App Server and (protocol) connection $530C_2$ uses TCP/5432 payload Postgres SQL, secondary workload $520C_3$ has a categorization of App server and (protocol) connection $530C_3$ uses TCP/5432 payload Postgres SQL, and secondary workload $520C_4$ has a categorization of iSCSI target and (protocol) connection $530C_4$ uses TCP/860 payload iSCSI.

Workload model 500C for primary workload 510C can be checked for sustained convergence with expected behavior (s). By way of non-limiting example, does primary workload 510C conform to the expected behavior (e.g., database server 510E in FIG. 5B) for a Postgres SQL server service type? Are the protocol connections maintained by primary workload 510C in workload model 500C consistent with expected behavior for a Postgres SQL service type (e.g., at least one of protocols and/or common ports, communications direction, and application payload/message semantics)? Are the categorizations of secondary workloads $520C_1$-$520C_4$ consistent with at least one of expected communications targets (or allowed communication partners)? Optionally, does the metadata (e.g., metadata 430 received from orchestration layer 410 in FIG. 4) consistent with workload model 500C (e.g., at least one of primary categorization (service type), protocols and/or common ports), communications target (allowed communication partners), communications direction, and application payload/message semantics? In some embodiments, workload model 500C having sustained convergence can be used to build a high-level security policy.

Figure 6:
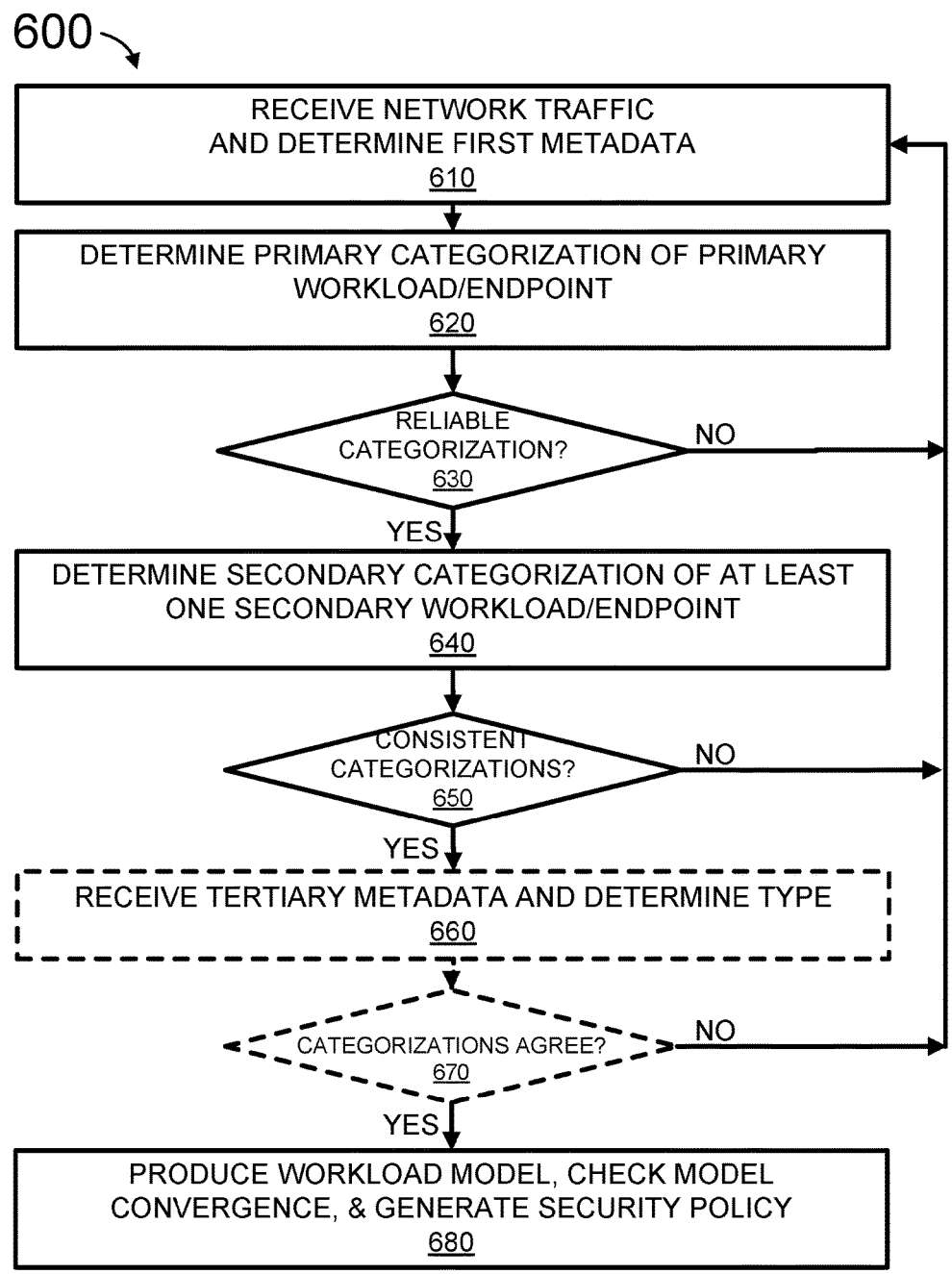
FIG. 6 is a simplified flow diagram of a method, according to various embodiments.

FIG. 6 illustrates a method (or process) 600 for generating a high-level declarative security policy (or statement), according to some embodiments. In various embodiments, method 600 is performed by enforcement point 250 (FIG. 4). At step 610, network traffic/communications between a primary VM (of VMs $260_1$-$260_V$ shown in FIG. 2) or container (of containers $340_{1,1}$-$340_{W,Z}$ shown in FIG. 4) and at least one secondary VM (of VMs $260_1$-$260_V$) or container (of containers $340_{1,1}$-$340_{W,Z}$) may be received, where the primary VM or container can be different from the secondary VM or container. For example, enforcement point 250 receives network communications originating from or arriving for the primary VM or container, the network communications arriving for or originating from (respectively) the secondary VM or container.

Additionally or alternatively at step 610, enforcement point 250 can determine first metadata associated with the network traffic. For example, the first metadata can be at least one of a source (IP) address and/or hostname, a source port, destination (IP) address and/or hostname, a destination port, protocol, application, and the like associated with each of the received network communications.

At step 620, a primary categorization—e.g., associated with the primary VM (of VMs $260_1$-$260_V$ shown in FIG. 2) or container (of containers $340_{1,1}$-$340_{W,Z}$ shown in FIG. 4)—may be determined. In some embodiments, the categories are application and/or service types (FIGS. 4 and 5B). The first metadata and models of expected behavior (e.g., included in models 440 (FIG. 4) and/or table 500B (FIG. 5B)) can be used to determine application and/or service type(s) (e.g., categories) associated with the received network communications. By way of non-limiting example, when first metadata matches one or more of the data under the "Protocols/Common Ports," "Target," "Direction," and "Application Payload/Message Semantics" columns in a row, the primary VM or container may be categorized with the "Service Type" for that row (FIG. 5B).

In addition or alternative to "Service Type," other tags/labels (e.g., name) can be used to indicate application grouping. For example, an operator using tags/labels may introduce more granularity into the service definition (e.g., differentiating between internal- and external-facing Web servers), and customize default heuristics based upon their specific application architectures. In this way, categorization can be modifiable and extensible.

At step 630, the primary categorization may be evaluated for reliability and/or stability. In some embodiments, the primary categorization may be determined to be reliable and/or stable after a predetermined amount of time elapses. For example, enough network traffic associated with the primary VM (of VMs $260_1$-$260_V$ shown in FIG. 2) or container (of containers $340_{1,1}$-$340_{W,Z}$ shown in FIG. 4) has been received to reliably categorize the VM or container and/or the categorization does not substantially change (e.g., the categorization from packet to packet remains the same within a predetermined tolerance for deviation). By way of further non-limiting example, probabilistic methods such as Bayesian probabilistic thresholds, linear progression towards a model fit, and the like are used to determine reliability and/or stability of the primary (and other) categorization. When the primary categorization is determined to be reliable and/or stable, method 600 may continue to step 640. When the categorization is determined not to be reliable and/or stable, method 600 can return to step 610.

At step 640, a secondary categorization associated with at least one secondary VM (of VMs $260_1$-$260_V$ shown in FIG. 2) or container (of containers $340_{1,1}$-$340_{W,Z}$ shown in FIG. 4) may be determined. The secondary VM or container is a VM or container with which the primary VM or container communicates (e.g., as represented by the received network traffic). The first metadata and models of expected behavior (e.g., included in models 440 (FIG. 4) and/or table 500B (FIG. 5B)) can be used to determine application and/or service type(s) (e.g., categories) associated with the secondary VM or container. By way of non-limiting example, when first metadata matching one or more of the data under the "Protocols/Common Ports," "Target," "Direction," and "Application Payload/Message Semantics" columns in a row may be categorized with the "Service Type" for that row (FIG. 5B).

At step 650, the primary and secondary categorizations can be evaluated for consistency. In some embodiments, the primary categorization, the secondary categorization, and models of expected behavior (e.g., included in models 440 (FIG. 4) and/or table 500B (FIG. 5B)) can be used to determine if the first and secondary categorizations are consistent. For example, when the "Service Type" associated with the secondary categorization matches (corresponds to) the "Target (allowed communication partners)" associated with the primary categorization, the primary and secondary categorizations may be determined to be consistent (e.g., agree with each other). By way of further non-limiting example, when the primary categorization is web server and the secondary categorization is file server, the primary and secondary categorizations may be determined to be consistent, because a web server communicating with a file server is an expected (network communications) behavior (e.g., as shown in FIG. 5B). When the primary and secondary categorizations are determined to be consistent, method 600 may continue to optional step 660. When the primary and secondary categorizations are determined not to be consistent, method 600 can return to step 610.

At optional step 660, tertiary metadata may be received. In some embodiments, tertiary metadata is metadata 430 received using API 420 (FIG. 4). Alternatively or additionally, at optional step 660 a type (e.g., tertiary categorization) can be determined from the received tertiary metadata. For example, an image type associated with a container in metadata 430 can be determined. According to some embodiments, an application/service running in the container is determined from the image type and the application/service running in the container is used as a tertiary categorization.

At optional step 670, the primary, secondary, and tertiary categorizations can be checked for agreement (e.g., consistency). In some embodiments, when the "Service Type" (FIG. 5B) associated with the primary categorization and secondary categorization matches the tertiary categorization (e.g., application/service running in the container), the primary, secondary, and tertiary categorizations may agree (e.g., be consistent with each other). For example, when the primary categorization and secondary categorization (e.g., determined from examination of network traffic) and the tertiary categorization (e.g., determined from metadata 430 (FIG. 4)) are all web server, the primary, secondary, and tertiary categorizations may be determined to be in agreement (consistent). By way of further non-limiting example, when the primary categorization and secondary categorization (e.g., determined from examination of network traffic) and the tertiary categorization (e.g., determined from metadata 430 (FIG. 4)) are all database, the primary, secondary, and tertiary categorizations may be determined to be in agreement (consistent). When the primary, secondary, and tertiary categorizations are determined to be in agreement (e.g., consistent), method 600 may continue to step 680. When the primary, secondary, and tertiary categorizations are determined not to be in agreement, method 600 can return to step 610.

At step 680, a model for a workload (or workload model; e.g., model 500C in FIG. 5C included in models 440 in FIG. 4) is produced for a workload (e.g., primary workload 510C). Alternatively or additionally, the workload model is checked for (sustained) convergence with expected behavior. For example, the protocol connections, categorization of secondary workloads, and optionally the metadata received from the container orchestration layer associated with the workload model are checked for conformity with the associated expected behavior(s). By way of further non-limiting example, probabilistic methods such as Bayesian probabilistic thresholds, linear progression towards a model fit, and the like are used to determine (sustained) convergence with expected behavior.

Optionally, at step 680 a security policy is generated using the workload model. For example, a high-level declarative security policy for the primary VM or container is produced using the workload model. In some embodiments, the workload model is used to determine expected (network communications) behaviors (e.g., the workload model is matched with one or more models of expected behavior associated with the workload model). A list of at least one of: allowed protocols, ports, and relationships for the database may be determined using the matched model(s) of expected behavior. By way of non-limiting example, when the workload model indicates the workload is a web server, an expected (network communications) behavior is outgoing communications with a file server (FIG. 5B).

A high-level security policy can comprise one or more high-level security statements, where there is one high-level security statement per allowed protocol, port, and/or relationship combination. The high-level declarative security policy can be at least one of: a statement of protocols and/or ports the primary VM or container is allowed to use, indicate applications/services that the primary VM or container is allowed to communicate with, and indicate a direction (e.g., incoming and/or outgoing) of permitted communications.

According to some embodiments, one application/service is subsequently used to identify several different machines associated with the single application/service. The high-level declarative security policy is at a high level of abstraction, in contrast with low-level firewall rules, which are at a low level of abstraction and only identify specific machines by IP address and/or hostname. Accordingly, one high-level declarative security statement can be compiled to produce hundreds or more of low-level firewall rules. The high-level security policy can be compiled by enforcement point 250 (or other machine) to produce a low-level firewall rule set. Compilation is described further in related United States Patent Application "Conditional Declarative Policies" (application Ser. No. 14/673,640) filed Mar. 30, 2015, which is hereby incorporated by reference for all purposes.

In some embodiments, method 600 is performed autonomically without intervention by an operator, other than operator input which may be received for model 440 (FIG. 4).

Figure 7:
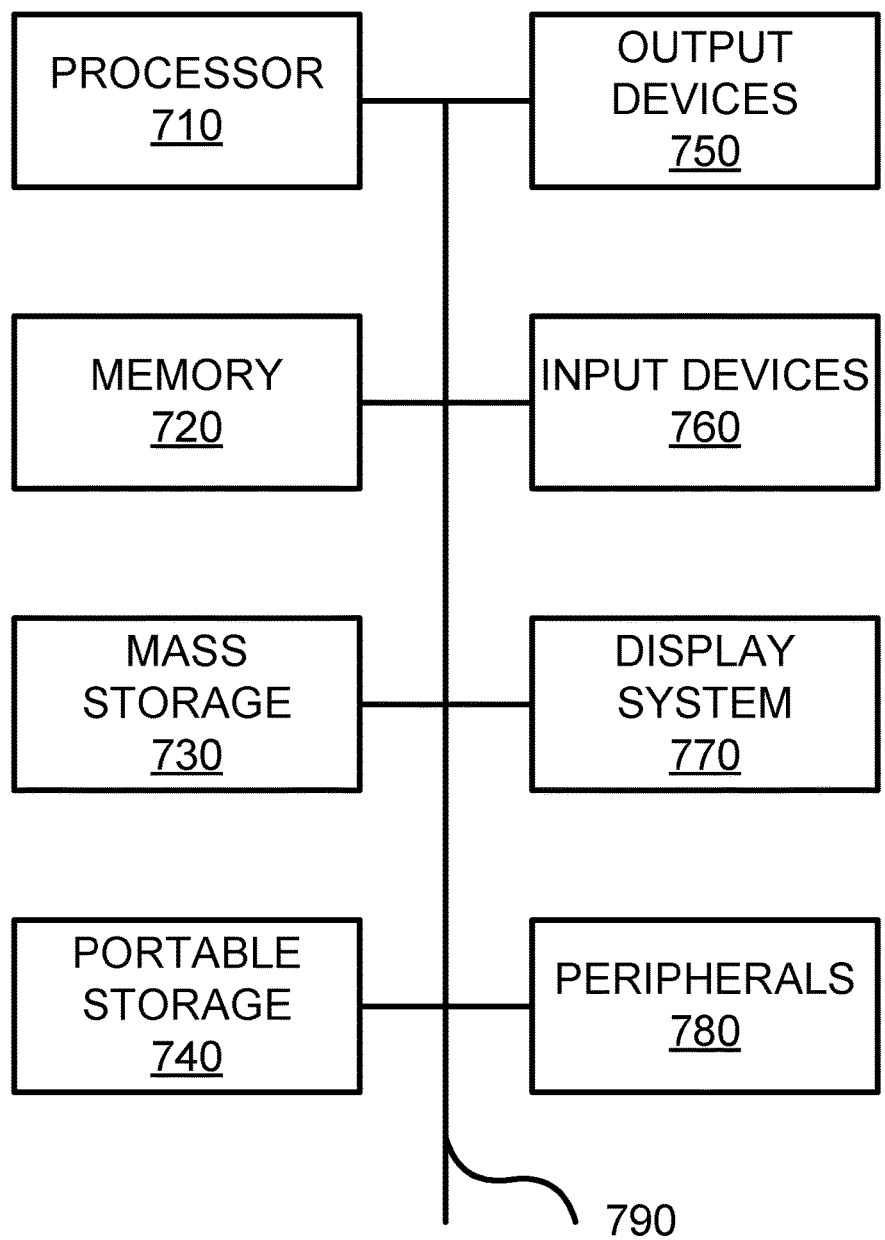
FIG. 7 is a simplified block diagram of a computing system, in accordance with some embodiments.

FIG. 7 illustrates an exemplary computer system 700 that may be used to implement some embodiments of the present invention. The computer system 700 in FIG. 7 may be implemented in the contexts of the likes of computing systems, networks, servers, or combinations thereof. The computer system 700 in FIG. 7 includes one or more processor unit(s) 710 and main memory 720. Main memory 720 stores, in part, instructions and data for execution by processor unit(s) 710. Main memory 720 stores the executable code when in operation, in this example. The computer system 700 in FIG. 7 further includes a mass data storage 730, portable storage device 740, output devices 750, user input devices 760, a graphics display system 770, and peripheral device(s) 780.

The components shown in FIG. 7 are depicted as being connected via a single bus 790. The components may be connected through one or more data transport means. Processor unit(s) 710 and main memory 720 are connected via a local microprocessor bus, and the mass data storage 730, peripheral device(s) 780, portable storage device 740, and graphics display system 770 are connected via one or more input/output (I/O) buses.

Mass data storage 730, which can be implemented with a magnetic disk drive, solid state drive, or an optical disk drive, is a non-volatile storage device for storing data and instructions for use by processor unit(s) 710. Mass data storage 730 stores the system software for implementing embodiments of the present disclosure for purposes of loading that software into main memory 720.

Portable storage device 740 operates in conjunction with a portable non-volatile storage medium, such as a flash drive, floppy disk, compact disk, digital video disc, or Universal Serial Bus (USB) storage device, to input and output data and code to and from the computer system 700 in FIG. 7. The system software for implementing embodiments of the present disclosure is stored on such a portable medium and input to the computer system 700 via the portable storage device 740.

User input devices 760 can provide a portion of a user interface. User input devices 760 may include one or more microphones, an alphanumeric keypad, such as a keyboard, for inputting alphanumeric and other information, or a pointing device, such as a mouse, a trackball, stylus, or cursor direction keys. User input devices 760 can also include a touchscreen. Additionally, the computer system 700 as shown in FIG. 7 includes output devices 750. Suitable output devices 750 include speakers, printers, network interfaces, and monitors.

Graphics display system 770 include a liquid crystal display (LCD) or other suitable display device. Graphics display system 770 is configurable to receive textual and graphical information and processes the information for output to the display device.

Peripheral device(s) 780 may include any type of computer support device to add additional functionality to the computer system.

The components provided in the computer system 700 in FIG. 7 are those typically found in computer systems that may be suitable for use with embodiments of the present disclosure and are intended to represent a broad category of such computer components that are well known in the art. Thus, the computer system 700 in FIG. 7 can be a personal computer (PC), hand held computer system, telephone, mobile computer system, workstation, tablet, phablet, mobile phone, server, minicomputer, mainframe computer, wearable, or any other computer system. The computer may also include different bus configurations, networked platforms, multi-processor platforms, and the like. Various operating systems may be used including UNIX, LINUX, WINDOWS, MAC OS, PALM OS, QNX ANDROID, IOS, CHROME, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 700 may be implemented as a cloud-based computing environment, such as a virtual machine operating within a computing cloud. In other embodiments, the computing system 700 may itself include a cloud-based computing environment, where the functionalities of the computing system 700 are executed in a distributed fashion. Thus, the computing system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud is formed, for example, by a network of web servers that comprise a plurality of computing devices, such as the computing system 700, with each server (or at least a plurality thereof) providing processor and/or storage resources. These servers manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, nonvolatile media, volatile media and transmission media. Nonvolatile media include, for example, optical, magnetic, and solid-state disks, such as a fixed disk. Volatile media include dynamic memory, such as system random-access memory (RAM). Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a programmable read-only memory (PROM), an erasable programmable read-only memory (EPROM), an electrically erasable programmable read-only memory (EEPROM), a Flash memory, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as JAVA, SMALLTALK, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

What is claimed is:

1. A computer-implemented method for security in virtualization, bare- metal server, and cloud computing environments comprising:
   receiving network traffic associated with a primary workload, the primary workload including a behavior and a relationship of a particular workload with a secondary workload;
   generating first metadata using the network traffic;
   determining a primary categorization associated with the primary workload, using the first metadata;
   confirming the primary categorization is reliable;
   determining a secondary categorization associated with at least one secondary workload, the at least one secondary workload being communicatively coupled to the primary workload;
   ascertaining the primary categorization and the secondary categorization are consistent with each other and are each stable;
   producing a model using the primary categorization and the secondary categorization, the model including a behavior and a relationship associated with the primary workload;
   checking the model for sustained convergence; and generating a high-level declarative security policy associated with the primary workload using the model, the high-level declarative security policy indicating at least an application or a service with which the primary workload can communicate.

2. The computer-implemented method of claim 1, wherein the network traffic comprises data communications between the primary workload and the secondary workload.

3. The computer-implemented method of claim 2, wherein:
   the primary, secondary, and tertiary categorizations are each associated with a respective application or service; and
   the application or service is at least one of: a database, email server, message queue, web server, Session Initiation Protocol (SIP) server, other media server, file server, service-oriented architecture (SOA) and/or microservices process, and object-based storage.

4. The computer-implemented method of claim 3 further comprising:
   receiving tertiary metadata associated with the primary workload;
   determining a tertiary categorization using the tertiary metadata; and
   checking the primary categorization matches the tertiary categorization.

5. The computer-implemented method of claim 4, wherein:
   the primary workload is a container;
   the tertiary metadata is received using an application programming interface (API) from an orchestration layer; and
   the tertiary metadata includes at least one of: an image name, image type, service name, and user-configurable tag or label associated with the container.

6. The computer-implemented method of claim 5, wherein the orchestration layer is at least one of: Kubernetes, Diego, Docker Swarm, and Mesos.

7. The computer-implemented method of claim 5, wherein determining the tertiary categorization includes:
   ascertaining an image type associated with the container using the tertiary metadata; and
   identifying the tertiary categorization using the image type;
   wherein the method further comprises:
   confirming the primary, secondary, and tertiary categorizations are consistent; and
   wherein the producing the model further uses the tertiary categorization.

8. The computer-implemented method of claim 3, wherein:
   the first metadata comprises at least two of: a source address and/or hostname, a source port, destination address and/or hostname, a destination port, protocol, application determination using APP-ID, and category;
   the primary categorization is determined at least in part using the first metadata and a second model, the second model including at least one of: a service or application category, protocols associated with the category that the primary workload should use, ports associated with the category that that the primary workload should use, applications associated with the category that should communicate with the primary workload, and services associated with the category that should communicate with the primary workload; and
   the secondary categorization is determined at least in part by assessing a relationship using communications between the primary and secondary workloads, and by confirming the communications between the primary and secondary workloads are consistent with at least an expected behavior of the primary categorization.

9. The computer-implemented method of claim 8, wherein ascertaining the primary categorization and the secondary categorization are consistent includes using the second model to check that the secondary categorization corresponds to an allowed communications partner associated with the primary categorization.

10. The computer-implemented method of claim 3, wherein: the confirming the primary categorization is reliable includes checking that a predetermined time has elapsed.

11. A system for security in virtualization, bare-metal server, and cloud computing environments comprising:
    a processor; and
    a memory coupled to the processor, the memory storing instructions which are executable by the processor to perform a method comprising:
    receiving network traffic associated with a primary workload;
    generating first metadata using the network traffic;
    determining a primary categorization associated with the primary workload, using the first metadata;
    confirming the primary categorization is reliable;

determining a secondary categorization associated with at least one secondary workload, the at least one secondary workload being communicatively coupled to the primary workload;

ascertaining the primary categorization and the secondary categorization are consistent with each other and are each stable;

producing a model using the primary categorization and the secondary categorization, the model including a behavior and a relationship associated with the primary workload;

checking the model for sustained convergence; and generating a high-level declarative security policy associated with the primary workload using the model, the high-level declarative security policy indicating at least an application or a service with which the primary workload can communicate.

12. The system of claim 11, wherein the network traffic comprises data communications between the primary workload and the secondary workload.

13. The system of claim 12, wherein:
the primary, secondary, and tertiary categorizations are each associated with a respective application or service; and
the application or service is at least one of: a database, email server, message queue, web server, Session Initiation Protocol (SIP) server, other media server, file server, service-oriented architecture (SOA) or microservices process, and object-based storage.

14. The system of claim 13, wherein the method further comprises:
receiving tertiary metadata associated with the primary workload;
determining a tertiary categorization using the tertiary metadata; and
checking the primary categorization matches the tertiary categorization.

15. The system of claim 14, wherein:
the primary workload is a container;
the tertiary metadata is received using an application programming interface (API) from an orchestration layer; and
the tertiary metadata includes at least one of: an image name, image type, service name, and user-configurable tag or label associated with the container.

16. The system of claim 15, wherein the orchestration layer is at least one of: Kubernetes, Diego, Docker Swarm, and Mesos.

17. The system of claim 15, wherein determining the tertiary categorization includes:
ascertaining an image type associated with the container using the tertiary metadata; and
identifying the tertiary categorization using the image type;
wherein the method further comprises:
confirming the primary, secondary, and tertiary categorizations are consistent; and wherein the producing the model further uses the tertiary categorization.

18. The system of claim 13, wherein:
the first metadata comprises at least two of: a source address and/or hostname, a source port, destination address and/or hostname, a destination port, protocol, application determination using APP-ID, and category;
the primary categorization is determined at least in part using the first metadata and a second model, the second model including at least one of: a service or application category, protocols associated with the category that the primary workload should use, ports associated with the category that that the primary workload should use, applications associated with the category that should communicate with the primary workload, and services associated with the category that should communicate with the primary workload; and
the secondary categorization is determined at least in part by assessing a relationship using communications between the primary and secondary workloads, and by confirming the communications between the primary and secondary workloads are consistent with at least an expected behavior of the primary categorization.

19. The system of claim 18, wherein ascertaining the primary categorization and the secondary categorization are consistent includes using the second model to check that the secondary categorization corresponds to an allowed communications partner associated with the primary categorization.

20. A non-transitory computer-readable storage medium having embodied thereon a program, the program being executable by a processor to perform a method for security in a container-based virtualization, bare-metal server, and cloud computing environments, the method comprising:
receiving network traffic associated with a primary workload;
generating first metadata using the network traffic;
determining a primary categorization associated with the primary workload, using the first metadata;
confirming the primary categorization is reliable;
determining a secondary categorization associated with at least one secondary workload, the at least one secondary workload being communicatively coupled to the primary workload;
ascertaining the primary categorization and the secondary categorization are consistent with each other and are each stable;
producing a model using the primary categorization and the secondary categorization, the model including a behavior and a relationship associated with the primary workload;
checking the model for sustained convergence; and
generating a high-level declarative security policy associated with the primary workload using the model, the high-level declarative security policy indicating at least an application or a service with which the primary workload can communicate.

* * * * *